E. SPRINGMAN.
FLOAT OPERATED STOCK WATERING APPARATUS.
APPLICATION FILED AUG. 21, 1914.

1,161,745.

Patented Nov. 23, 1915.

Witnesses

Inventor
Edward Springman,
By Franklin H. Hoyt
Attorney

UNITED STATES PATENT OFFICE.

EDWARD SPRINGMAN, OF ANSLEY, NEBRASKA.

FLOAT-OPERATED STOCK-WATERING APPARATUS.

1,161,745.  Specification of Letters Patent.  Patented Nov. 23, 1915.

Application filed August 21, 1914. Serial No. 857,955.

*To all whom it may concern:*

Be it known that I, EDWARD SPRINGMAN, a citizen of the United States, residing at Ansley, in the county of Custer and State of Nebraska, have invented certain new and useful Improvements in Float-Operated Stock-Watering Apparatus; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in float-operated valves for stock watering troughs and comprises a simple and efficient device of this nature having various details of construction, combinations and arrangements of parts which will be hereinafter fully described, shown in the accompanying drawings and then specifically defined in the appended claim.

Figure 1:
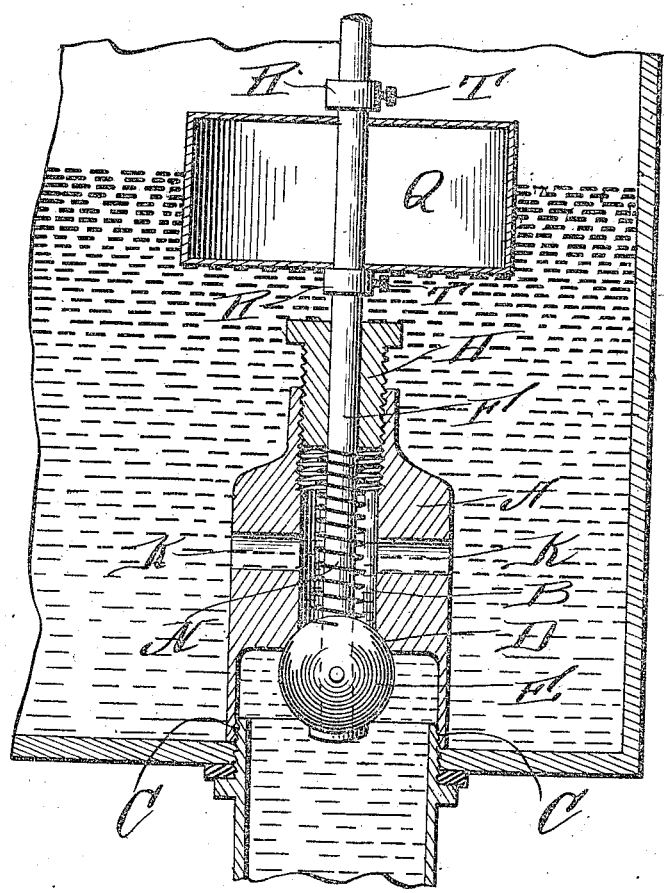
Figure 2:
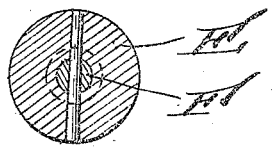

My invention is illustrated in the accompanying drawings, in which:

Figure 1 is a central longitudinal sectional view through the apparatus, and Fig. 2 is a cross sectional view through the valve.

Reference now being had to the details of the drawings by letter, A designates the casing which has a longitudinal passageway B therethrough and its lower portion is recessed with its wall interiorly threaded as at C for engagement with circumferential threads formed about a water pipe through which water under pressure is adapted to be conveyed to the casing. The lower end of said passageway B has a beveled valve seat D against which the spherical-shaped valve E is adapted to seat. The valve is provided with a stem F, movable through a threaded adjusting nut H, fitted in the upper end of the casing A, and laterally extending passageways K extend from the passageway D and through which the water makes exit in the casing. A coiled spring N is mounted upon the stem F and is interposed between the valve and the nut H, said nut having threaded connection with the casing and is adapted to regulate the pressure of the spring according to the pressure of the water which is conveyed to the casing. A float, designated by letter Q, is mounted upon said stem and is held in different adjusted positions by means of the collars R, each of which has an adjusting screw T fitted in a threaded aperture therein.

The operation of my invention will be readily understood and is as follows: The spring is adjusted to the pressure upon the water in the supply pipe, said valve being normally open when the tank is empty. As the water raises the float, the valve will move to its seat and automatically shut off the supply.

What I claim to be new is:—

A float-actuated valve comprising a tank with a threaded inlet opening in the bottom, a shouldered pipe, circumferentially threaded and engaging the threads of said opening and extending above the bottom thereof, a cylindrical shell having a recess in the bottom, the wall of which is internally threaded for engagement with the threads upon said pipe, the lower end of said shell adapted to bear against the bottom of the tank, said shell having a central passageway leading therethrough with laterally extending outlets leading therefrom, the lower marginal edge of which passageway is beveled forming a valve seat, the wall of the upper end of said passageway being internally threaded, an apertured plug engaging the threaded portion of the passageway, a float-actuated valve stem movable through said plug, a valve supported by the stem, and a spring interposed between the valve and plug.

In testimony whereof I hereunto affix my signature in presence of two witnesses.

EDWARD SPRINGMAN.

Witnesses:
 R. P. HIGGINS,
 H. F. SPRINGMAN.